United States Patent
Schuster et al.

(10) Patent No.: US 11,571,619 B1
(45) Date of Patent: Feb. 7, 2023

(54) CROSS-REGION MANAGEMENT OF GAME SERVER FLEETS

(71) Applicant: Amazon Technologies, Inc., Seattle, WA (US)

(72) Inventors: Brian J. Schuster, Seattle, WA (US); Akshay Gopal Shetty, Seattle, WA (US); Xiaohang Miao, Seattle, WA (US); Jonathan Robert Bush, Olalla, WA (US); Joseph Richard Thompson, Austin, TX (US); Dajun Duan, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/403,458

(22) Filed: Aug. 16, 2021

(51) Int. Cl.
*A63F 13/00* (2014.01)
*A63F 9/24* (2006.01)
*A63F 13/35* (2014.01)
*A63F 13/335* (2014.01)

(52) U.S. Cl.
CPC ............ *A63F 13/35* (2014.09); *A63F 13/335* (2014.09); *A63F 2300/407* (2013.01); *A63F 2300/513* (2013.01); *A63F 2300/531* (2013.01)

(58) Field of Classification Search
CPC .. A63F 13/35; A63F 13/335; A63F 2300/352; A63F 2300/407; A63F 2300/51; A63F 2300/513; A63F 2300/531; G06F 2209/541; H04L 67/1004; H04L 67/1021
See application file for complete search history.

(56) References Cited

U.S. PATENT DOCUMENTS

| | | | | |
|---|---|---|---|---|
| 5,828,843 A * | 10/1998 | Grimm | ................ | G06F 9/5044 709/204 |
| 10,169,778 B1 * | 1/2019 | Collin | ................ | G06Q 30/0246 |
| 10,713,072 B1 * | 7/2020 | Burgin | ............. | G06Q 10/06315 |
| 10,795,913 B2 * | 10/2020 | Gupte | ..................... | G06F 16/27 |

(Continued)

OTHER PUBLICATIONS

Bush, Jonathan, "Amazon GameLift is now easier to manage fleets across regions", Mar. 17, 2021 (retrieved Jun. 15, 2022), <https://web.archive.org/web/20210317012226/https://aws.amazon.com/blogs/gametech/amazon-gamelift-is-now-easier-to-manage-fleets-across-regions/> (Year: 2021).*

(Continued)

*Primary Examiner* — Milap Shah
*Assistant Examiner* — Jason Pinheiro
(74) *Attorney, Agent, or Firm* — BakerHostetler

(57) ABSTRACT

A multi-region game server fleet may span a plurality of computing regions including a home computing region and one or more remote computing regions. A fleet management service operating in the home computing region may receive a request to perform a modification to the multi-region game server fleet, such as adding an additional remote computing region, removing an existing remote computing region, or making a configuration change. The modification may be performed, at least in part, by one or more region specific worker processes hosted in the home region. The fleet management service operating in the home computing region may also receive a request to perform an interaction with a specific remote region game server. An instruction corresponding to the interaction may be transmitted, by a region-specific computing function hosted in the home region, to the specific remote region game server.

20 Claims, 8 Drawing Sheets

(56) References Cited

U.S. PATENT DOCUMENTS

| | | | | |
|---|---|---|---|---|
| 10,994,198 | B1* | 5/2021 | Byskal | A63F 13/358 |
| 2004/0116186 | A1* | 6/2004 | Shim | A63F 13/352 |
| | | | | 463/42 |
| 2006/0258463 | A1* | 11/2006 | Cugno | A63F 13/795 |
| | | | | 463/42 |
| 2007/0184904 | A1* | 8/2007 | Lee | A63F 13/10 |
| | | | | 463/42 |
| 2016/0296842 | A1* | 10/2016 | Kamiyama | G09B 23/28 |
| 2018/0307748 | A1* | 10/2018 | Freilinger | G06F 16/3346 |
| 2021/0227035 | A1* | 7/2021 | Vinograd | G06F 9/5072 |
| 2022/0045985 | A1* | 2/2022 | Bareket | H04L 63/0272 |

OTHER PUBLICATIONS

Modi, Adit, "Introduction to Game Tech with AWS", May 31, 2021 (Retrieved Jun. 15, 2022), <https://web.archive.org/web/20210531153131/https://dev.to/aws-builders/introduction-to-game-tech-with-aws-4f03> (Year: 2021).*

"Setting up GameLift fleets", Jan. 24, 2022 (Retrieved Jun. 15, 2022), <https://web.archive.org/web/20220124221635/https://docs.aws.amazon.com/gamelift/latest/developerguide/fleets-intro.html> (Year: 2022).*

"Game Architecture with Amazon GameLift", 2017 Dec. 2017 (Retrieved Jun. 15, 2022), <https://web.archive.org/web/20171210074228/http://docs.aws.amazon.com/gamelift/latest/developerguide/gamelift-architecture.html> (Year: 2017).*

"How GameLift Works" Mar. 18, 2022 (Retrieved Jun. 15, 2022), <https://web.archive.org/web/20220318025101/https://docs.aws.amazon.com/gamelift/latest/developerguide/gamelift-howitworks.html> (Year: 2022).*

"How GameLift fleet creation works", May 16, 2021 (retrieved Jun. 15, 2022), <https://web.archive.org/web/20210516095420/https://docs.aws.amazon.com/gamelift/latest/developerguide/fleets-creation-workflow.html> (Year: 2021).*

"How GameLift FleetIQ works", May 6, 2021 (retrieved Jun. 15, 2022), <https://web.archive.org/web/20210506171936/https://docs.aws.amazon.com/gamelift/latest/fleetiqguide/gsg-howitworks.html> (Year: 2021).*

"What is GameLift FleetIQ?", Feb. 27, 2021 retrieved Jun. 15, 2022), <https://web.archive.org/web/20210227184856/https://docs.aws.amazon.com/gamelift/latest/fleetiqguide/gsg-intro.html> (Year: 2021).*

* cited by examiner

US 11,571,619 B1

CROSS-REGION MANAGEMENT OF GAME SERVER FLEETS

CROSS-REFERENCE TO RELATED APPLICATIONS

This application is related to the following application, which is hereby incorporated by reference in its entirety: U.S. patent application Ser. No. 17/403,324 filed Aug. 16, 2021, entitled "MULTI-REGION GAME SERVER FLEETS".

BACKGROUND

Multi-tenant gaming services are gaming services that host execution of video games on behalf of multiple customers (i.e., tenants). Specifically, a customer may pay the gaming service for use of computing resources, such as game servers, that are employed to host execution of video games on behalf of the customer. Some multi-tenant gaming services span multiple computing regions. Computing regions are separate collections of computing resources (e.g., data centers, servers, virtual machines, etc.) that are provided by a computing services provider (e.g., a gaming service) and that are located in corresponding geographic areas. Some gaming services employ the concept of a video game fleet, which is a set of game servers to which an individual deployment of a video game build may be performed. For example, to deploy a video game build, a customer may upload the video game build to the gaming service and create a video game fleet specifying the video game build. In some conventional gaming services, a video game fleet is confined to only a single computing region, meaning that a single video game fleet cannot span computing multiple regions.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
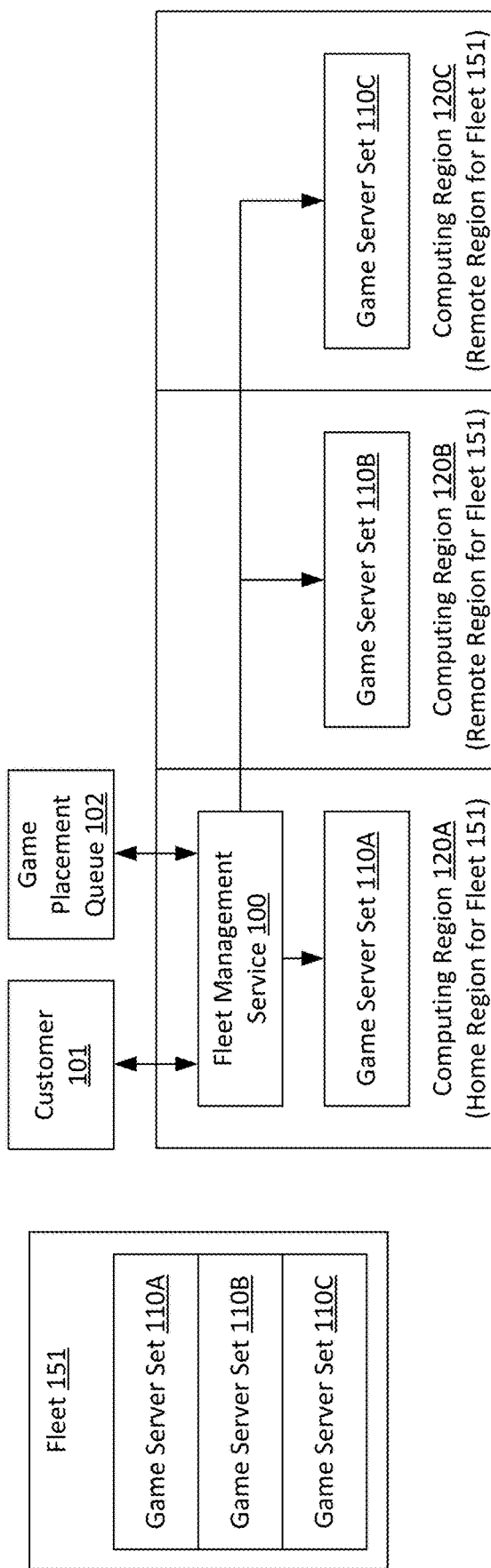
FIG. 1 is a diagram illustrating a multi-region game server fleet that may be used in accordance with the present disclosure.

Techniques for implementation of multi-region game server fleets are described herein. In some examples, a multi-tenant gaming service may generate, on behalf of a customer, a multi-region game server fleet, which is a game server fleet that includes game servers executing in multiple computing regions. Each multi-region fleet may have a single respective home computing region, which may be selected by a customer. Each multi-region fleet may also have any number of respective remote computing regions, which may also be selected by the customer. A plurality of game server sets may be created and may execute across the home computing region and the remote computing regions. The customer may optionally add, and remove, remote computing regions at any time during operation of the fleet. In some examples, the customer may perform all fleet-related interactions (e.g., adding and removing remote regions, making configuration changes, requesting metrics and logs, etc.) with the home computing region. Additionally, certain resources, such as a game session placement queue, may also perform all fleet-related interactions with the home computing region. The home computing region may also be responsible for propagating instructions associated with those interactions to the remote computing regions and for confirming that those instructions have been received and/or satisfied. In some examples, a fleet management service, which may handle client and resource interactions with the multi-region fleet, may execute in the home region, thereby allowing fleet interactions to be performed with the home region.

In some conventional gaming services, it is common for customers to deploy a single video game build to several single-region fleets across several respective computing regions. One reason for this is that latency from players to the game server directly impacts the gameplay experience. The easiest way to reduce latency is to be deployed to as many computing regions as possible, which allows faster interaction with players in those same computing regions. This may often cause customers to deploy in every possible region as the default. However, creating and maintaining several single-region fleets of the same build may be a difficult and time-consuming task for a customer. For example, the customer may have to expend the time and effort to individually generate and configure several fleets in several different regions, which may include separately uploading the same build to several different computing regions. Additionally, if the customer wishes to make a configuration change (e.g., adding, removing or changing a scaling policy, port settings, etc.), the customer might be required to separately make this change several times in several different regions, even when the same configuration change is desired in multiple regions. Furthermore, the customer may need to configure certain resources, such as game placement queues, to interact with multiple different fleets, thereby increasing the time and complexity for configuration of these resources. Moreover, in some examples, a customer may need to query a specific fleet to view game session data (e.g., fleet performance metrics, game session logs, etc.) for that fleet, thereby making it difficult for the customer to view game session data aggregated across multiple regions. As yet another example, certain non-robust computing regions may lack support for certain computing services (e.g., data storage services, monitoring services, queueing services, notification services, etc) and may not be capable of individually supporting a traditional single-region game server fleet.

In contrast to these existing techniques, the use of multi-region game server fleets (also referred to hereinafter as multi-region fleets) may provide a number of advantages. For example, the use of multi-region fleets may allow a customer to upload a build only once and create a fleet only one time in one place, while still allowing the fleet to execute across multiple different computing regions. Moreover, the use of multi-region fleets may allow a customer to make a single configuration change (e.g., adding, removing or changing a scaling policy, port settings, etc.) one time in one place, and to have that single configuration change optionally applied to the fleet in several different regions. Furthermore, in some examples, certain resources, such as game placement queues, may interact only with the home region in a multi-region fleet, thereby reducing the time and complexity required to configure those resources. Moreover, in some examples, a multi-region fleet may allow game session data (e.g., fleet performance metrics, game session logs, etc.) to be aggregated across multiple computing regions in a multi-region fleet and/or across only a single computing region. As yet another example, multi-region game server fleets may allow sets of game servers to operate in certain non-robust remote computing regions that may lack support for certain computing services (e.g., data storage services, monitoring services, queueing services, notification services, etc) and that may not be capable of individually supporting a traditional single-region game server fleet.

In some examples, a multi-region game server fleet may employ a nanny service for propagating modifications to remote regions. These modifications may include, for example, adding a remote region to the fleet, removing a remote region from the fleet, and performing configuration changes (e.g., adding, removing or changing a scaling policy, port settings, etc.). In some examples, the nanny service may include a fleet worker and one or more region-specific workers each corresponding to a respective remote region. In some cases, both the fleet worker and the region-specific workers may operate asynchronously. The use of asynchronous workers may improve resiliency to frequent customer modifications, such as to assist in scenarios when a customer changes a configuration before a previous change has been fully applied. Moreover, the use of workers that are both region-specific and asynchronous may improve resiliency to outages or backups in remote computing regions. For example, the use of asynchronous region-specific workers may prevent an outage or backup in a given remote region from cascading/spreading to other regions.

In some examples, when a remote region is being added to the fleet, a fleet management service operating in the home computing region may record an indication of the new region in a fleet resource record. The fleet worker may then create a region-specific resource record for the new region. The creation of the region-specific resource record may then trigger the creation of a region-specific worker for that region, and the region-specific worker may launch a creation workflow for the new region, which may include copying a virtual machine image to the region and creating a set of game servers in the new region based on the virtual machine image (e.g., by copying the virtual machine image to game servers in the set of game servers). For a configuration change, the fleet management service may record the configuration change in the fleet resource record (if the change applies across all regions in the fleet) or in individual region-specific resource records (if the change applies only to specific remote regions). Region-specific workers may periodically check (e.g., via internal application programming interfaces (API's)) the fleet resource record and their respective region-specific resource records to determine if any new configuration changes have been recorded. When new configuration changes are recorded, the region-specific workers may then propagate the new configuration changes to their respective remote regions. When a remote region is being removed from the fleet, the fleet management service operating in the home computing region may record an indication to remove the region in the fleet resource record. The region-specific worker for that region may then become aware of this indication and begin a workflow to cease operation of the game server set in that remote region.

Additionally, in some examples, region-specific serverless computing functions may be employed to allow real-time interactions with specific game servers in specific remote computing regions. Examples of these interactions may include instructing the game server to create a game session, remotely accessing the game server (e.g., to debug the game server, to gather benchmarking data, to observe activity in real-time), and the like. In some examples, asynchronous region-specific serverless computing functions executing in the home region may be invoked to assist in these interactions with individual game servers executing in remote regions. The use of serverless computing functions that are both region-specific and asynchronous may improve resiliency to outages or backups in remote computing regions. For example, the use of asynchronous region-specific serverless computing functions may prevent an outage or backup in a given remote region from cascading/spreading to other regions. Moreover, because serverless computing functions may often have concurrency limits, the use of region-specific serverless computing functions may also prevent a highly trafficked region from monopolizing these resources. The game servers in the remote regions may also send acknowledgements related to these interactions to the fleet management service operating in the home region. Moreover, the game servers may also report performance metrics to the fleet management service operating in the home region.

FIG. 1 is a diagram illustrating an example of a multi-region game server fleet that may be used in accordance with the present disclosure. As shown in FIG. 1, fleet 151 is a multi-region game server fleet. Fleet 151 includes game server set 110A, game server set 110B, and game server set 110C. Game server set 110A operates in computing region 120A. Game server set 110B operates in computing region 120B. Game server set 110C operates in computing region 120C. Game server sets 110A, 110B and 110C may be auto-scaling groups. A game server is a physical and/or virtual computing resource that executes one or more video game sessions. In one specific example, a game server may be a virtual machine (sometimes referred to as virtual machine instance), and game server sets 110A, 110B and 110C may be sets of virtual machines.

Computing region 120A is a home region for fleet 151, while computing regions 120B and 120C are remote regions for fleet 151. Fleet 151 may be hosted, by a multi-tenant gaming service, on behalf of customer 101. As shown in FIG. 1, fleet management service 100, which allows management of fleet 151, operates in the home region (computing region 120A). As also shown in FIG. 1, the fleet management service 100 may handle interactions with customer 101 and with game placement queue 102. Some example interactions with customer 101 may include requests to add a new remote computing region to the fleet 151, requests to remove an existing remote computing region from the fleet 151, requests for metrics and logs, and requests to perform configuration changes.

It is noted that a gaming service may allow customer 101 to optionally apply a configuration change to the entire fleet 151 (e.g., to all computing regions in the fleet) or to only one or more specific computing regions in the fleet 151. One example of a configuration change that may be requested by customer 101 is a scaling policy. Some scaling policies may indicate an upper threshold of resource usage by game servers in a game server set that may trigger one or more new game servers to be launched. Some scaling policies may also indicate a lower threshold of resource usage by game servers in a game server set that may cause one or more existing game servers to eventually be removed from service. In some examples, a gaming service may allow customer 101 to optionally apply a single scaling policy to all game server sets 110A, 110B and 110C in all computing regions of fleet 151 (i.e., to all of computing regions 120A, 120B and 120C). Additionally, the gaming service may also allow customer 101 to optionally apply separate scaling policies to one or more of game server sets 110A, 110B and/or 110C in one or more of the computing regions of fleet 151 (i.e., in one or more of computing regions 120A, 120B and/or 120C).

Game placement queue 102 is a resource that may be created by customer 101 and that may be used to queue game placement requests and then issue calls to create new game sessions on specific game servers for fleet 151, including game server sets 110A, 110B and 110C. In some examples, the fleet 151 may dictate where capacity can be available, and the game placement queue 102 may be responsible for making the tradeoff decision between latency and compute cost when placing a new game session for a group of players. For example, the game placement queue 102 may receive player latency information and attempt to create the game session on the region that would give those players the lowest latency experience. Upon selecting a specific region in which to create a game session, the game placement queue 102 may issue a request, to the fleet management service 100 in the home computing region (computing region 120A), to create a new game session in the selected region. For example, if the game placement queue 102 selects to create a new game session in computing region 120C, a request to create this new game session may be issued to the fleet management service 100 in the home computing region (computing region 120A). Thus, the customer 101 need only configure the game placement queue 102 to send new game session requests to the home computing region, thereby simplifying the process of configuring the game placement queue 102.

In some examples, one or more of the remote computing regions (computing regions 120B and 120C) may sometimes be non-robust computing regions that may lack support for certain computing services that may be supported in the home computing region (computing region 120A), such as data storage services, monitoring service, queueing services, notification services, and the like. Thus, in some examples, one or more of the remote computing regions (computing regions 120B and 120C) may sometimes not be capable of individually supporting traditional single-region game server fleets. The use of a multi-region game server fleet, such as fleet 151, may allow game servers to operate in these non-robust computing regions. It is noted that the term computing region, as used herein, may optionally encompass non-robust computing locations that may not necessarily be referred to as regions by a gaming service that may operate those locations.

Figure 2:
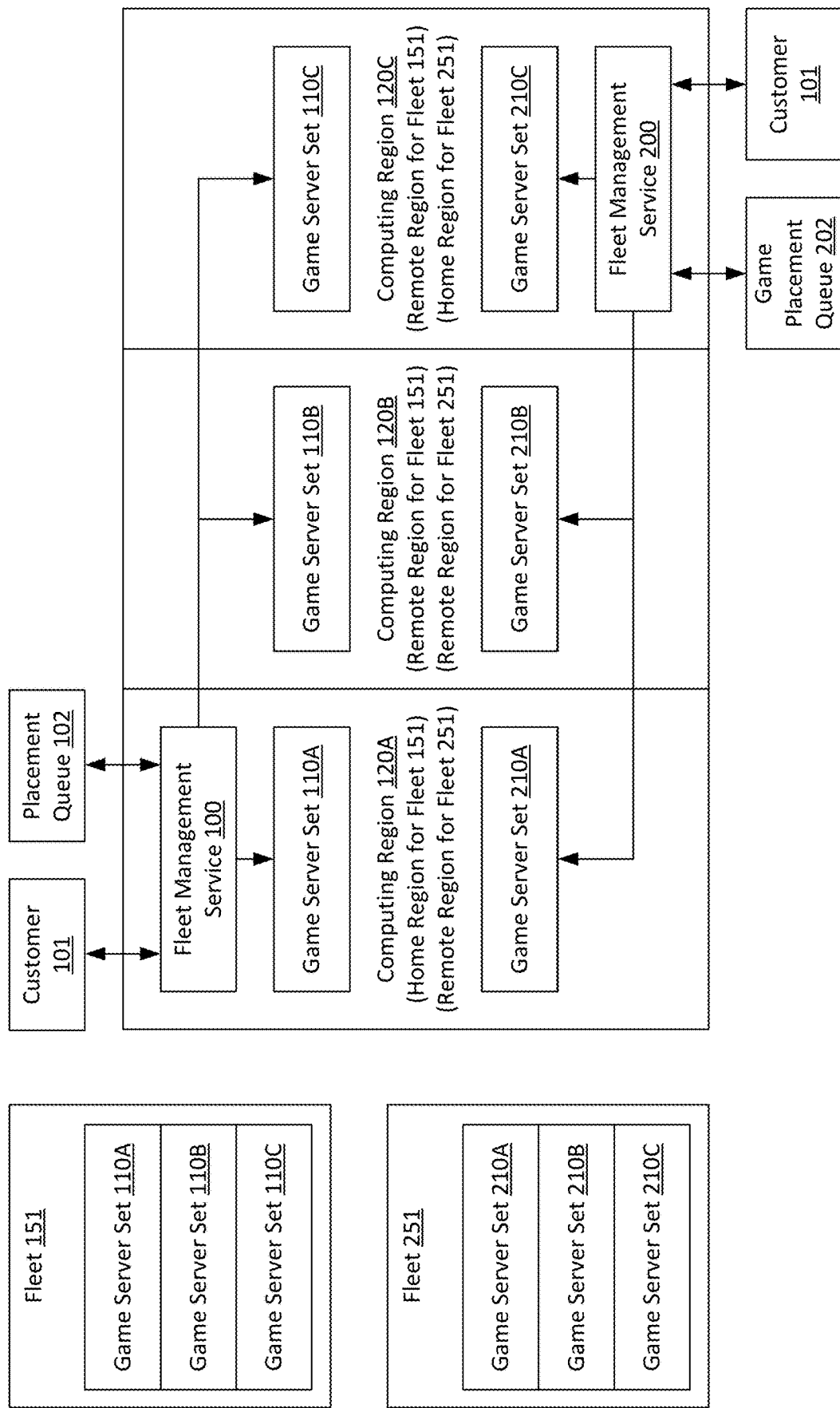
FIG. 2 is a diagram illustrating example multi-region game server fleets with different home regions that may be used in accordance with the present disclosure.

As will be described in detail below, interactions with the remote computing regions of fleet 151 (computing regions 120B and 120C) may be designed to limit the impact of backups or outages within those regions, such that those backups do not spread to other computing regions of the fleet 151. It is noted, however, that, because fleet management service 100 operates in the home computing region (computing region 120A), a backup or outage in the home computing region may impact the entire fleet 151. In order to provide redundancy against backups or outages in a home computing region, some customers may decide to create a plurality of multi-region fleets with different respective home regions. Referring now to FIG. 2, an example is shown in which customer 101 creates two multi-region game server fleets, which include fleet 151 and fleet 251. It is noted that fleet 151 of FIG. 2 is identical to fleet 151 of FIG. 1, and the above description of fleet 151 of FIG. 1 may therefore also apply to fleet 151 of FIG. 2.

As shown in FIG. 2, fleet 251 includes game server set 210A, game server set 210B, and game server set 210C. Game server set 210A operates in computing region 120A. Game server set 210B operates in computing region 120B. Game server set 210C operates in computing region 120C. Game server sets 210A, 210B and 210C may be auto-scaling groups. Computing region 120C is a home region for fleet 251, while computing regions 120A and 120B are remote regions for fleet 151. Both fleet 151 and fleet 251 may be hosted, by a multi-tenant gaming service, on behalf of customer 101. As shown in FIG. 2, fleet management service 200, which allows management of fleet 251, operates in the home region (i.e., computing region 120C). As also shown in FIG. 2, the fleet management service 200 may handle interactions with customer 101 and with game placement queue 202. Game placement queue 202 is a resource that may be created by customer 101 and that may be used to queue game placement requests and then issue calls to create new game sessions on specific game servers for fleet 251, including game server sets 210A, 210B and 210C.

As described above, fleet 151 has its home computing region in computing region 120A, while fleet 251 has its home computing region in computing region 120C. Thus, fleet 251 may provide redundancy, to customer 101, in the case of a backup or outage in computing region 120A. Similarly, fleet 151 may provide redundancy, to customer 101, in the case of a backup or outage in computing region 120C. It is noted that, while fleets 151 and 251 may overlap one another in computing regions 120A, 120B and 120C, they do not impact the operation of one another. For example, if customer 101 decided to remove computing region 120B from fleet 251, this decision would have no impact on fleet 151. Thus, computing region 120B would continue to serve as a remote computing region for fleet 151 even if computing region 120B was removed from fleet 251. As another example, if customer 101 decided to create a new scaling policy for computing region 120C for fleet 151, this decision would have no impact on fleet 251. Thus, the new scaling policy could be applied to computing region 120C for fleet 151, while having no effect on computing region 120C for fleet 251.

In some examples, a multi-region game server fleet may employ a nanny service for propagating modifications to remote regions. In some examples, the nanny service may include a fleet worker and one or more region-specific workers each corresponding to a respective remote region.

Figure 3:
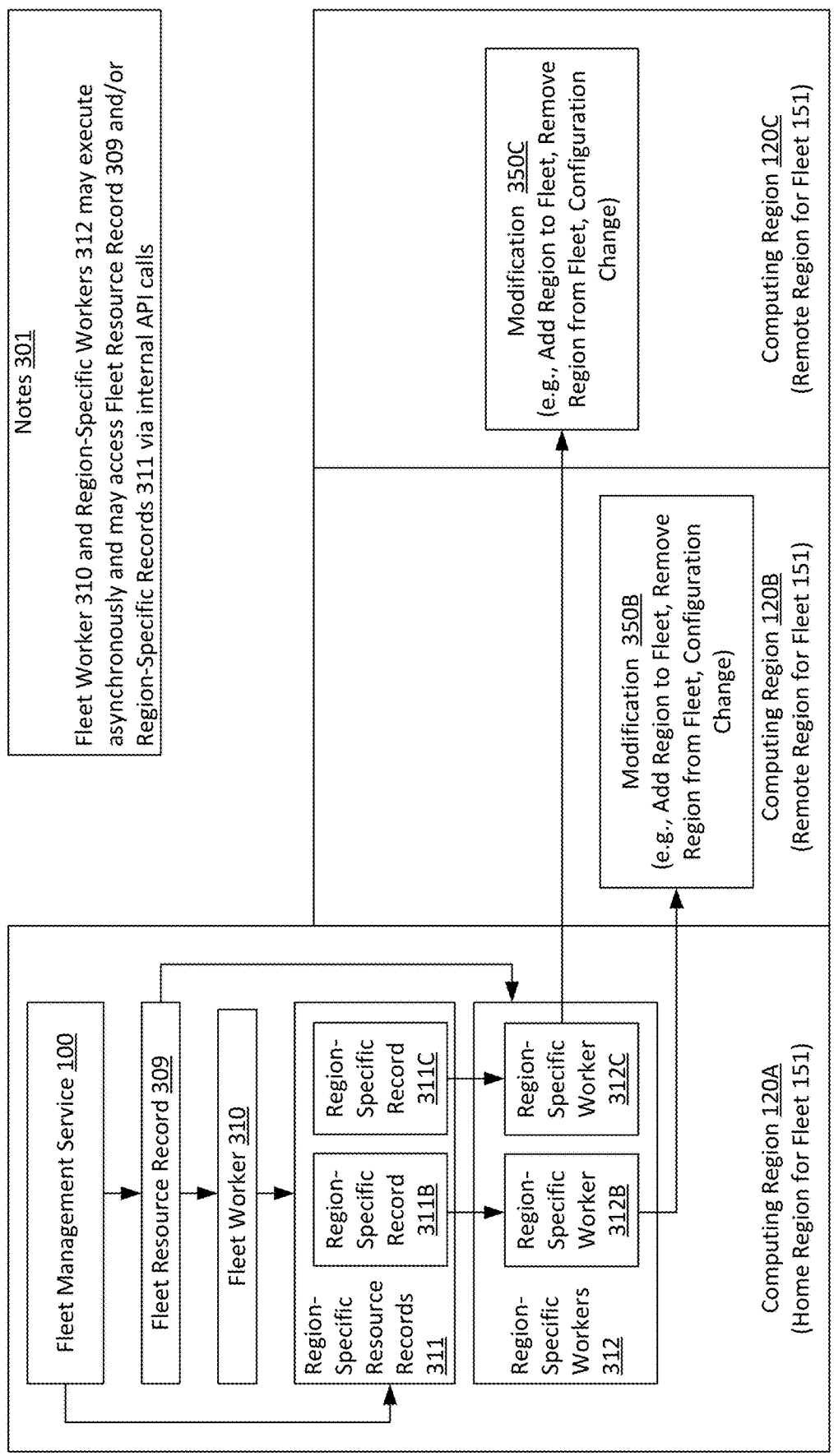
FIG. 3 is a diagram illustrating an example system for propagation of modifications to remote computing regions that may be used in accordance with the present disclosure.

Referring now to FIG. 3, an example system for propagation of modifications to remote computing regions will now be described in detail. Specifically, as shown in FIG. 3, worker processes including fleet worker 310 and region-specific workers 312 may operate in computing region 120A, which is the home computing region of fleet 151. Region-specific workers 312 include region-specific worker 312B (corresponding to computing region 120B) and region-specific worker 312C (corresponding to computing region 120C). Computing region 120A further includes fleet resource record 309 and region-specific resource records 311. The fleet resource record 309 may include, for example, indications of remote regions that are currently included in the fleet 151 as well as indications of fleet-wide configuration settings. The region-specific resource records 311 may include, for example, indications of region-specific configuration settings. Moreover, creation of one of region-specific resource records 311 may cause a respective one of the region-specific workers 312 to be generated for the corresponding region.

Region-specific resource records 311 include region-specific resource record 311B (corresponding to computing region 120B) and region-specific resource record 311C (corresponding to computing region 120C). As will be described in detail below, region-specific worker 312B may be employed to propagate modification 350B to computing region 120B. For example, region-specific worker 312B may be employed to perform, at least in part, modification 350B in computing region 120B. Additionally, region-specific worker 312C may be employed to propagate modification 350C to computing region 120C. For example, region-specific worker 312C may be employed to perform, at least in part, modification 350C in computing region 120C. Modifications 350B and 350C may include, for example, adding a remote region to the fleet, removing a remote region from the fleet, and performing configuration changes (e.g., adding, removing or changing a scaling policy, port settings, etc.).

In some examples, when a remote region is being added to the fleet 151, the fleet management service 100 operating in the home computing region (computing region 120A) may record an indication of the new region in fleet resource record 309. The fleet worker 310 may then create one of region-specific resource records 311 for the new region, thereby triggering creation of one of region-specific workers 312 for that region. For example, when computing region 120B is added to fleet 151, the fleet management service 100 may record an indication of computing region 120B as a remote region in fleet resource record 309. The fleet worker 310 may then create region-specific resource record 311B for computing region 120B. The creation of region-specific resource record 311B may trigger creation of region-specific worker 312B. The region-specific worker 312B may then launch a creation workflow for the computing region 120B, which may include copying a virtual machine image to computing region 120B and creating game server set 110B in computing region 120B based on the virtual machine image (e.g., by copying the virtual machine image to game servers in game server set 110B). Thus, in this example, modification 350B would include adding computing region 120B to fleet 151, such as including launching the creation workflow for the computing region 120B. It is noted that the above-described process may be employed to add original remote locations that are part of the fleet 151 when the fleet 151 is originally created as well as subsequent remote locations that are added after the fleet 151 has already been created.

For a configuration change, the fleet management service 100 may record the configuration change in the fleet resource record 309 (if the change applies across all regions in the fleet) or in one or more of the region-specific resource records 311 (if the change applies only to specific remote regions). Region-specific workers 312 may periodically check (e.g., via internal API's) the fleet resource record 310 and their respective region-specific resource records 311 to determine if any new configuration changes have been recorded. For example, for a configuration change that is made only to computing region 120B, the fleet management service 100 may record the configuration change in region-specific resource record 311B. Region-specific worker 312B may check region-specific resource record 311B to determine that the new configuration change has been recorded. Region-specific worker 312B may then propagate the new configuration change to computing region 120B. Thus, in this example, modification 350B would include triggering and applying the configuration change to computing region 120B.

When a remote region is being removed from the fleet 151, the fleet management service 100 may record an indication to remove the region in the fleet resource record 309. One of the region-specific workers 312 for that region may then become aware of this indication and begin a workflow to cease operation of fleet 151 in that remote region. For example, if computing region 120B were being removed from fleet 151, the fleet management service 100 may record an indication to remove the computing region 120B from fleet 151 in the fleet resource record 309. Region-specific worker 312B may then become aware of this indication and begin a workflow to cease operation of fleet 151 in computing region 120B. Thus, in this example, modification 350B would include removing computing region 120B from fleet 151, such as including launching a removal workflow for the computing region 120B.

As indicated in notes 301, the fleet worker 310 and the region-specific workers 312 may operate asynchronously. The use of asynchronous workers may improve resiliency to frequent customer modifications, such as to assist in scenarios when a customer changes a configuration before a previous change has been fully applied. Moreover, the use of region-specific workers 312 that are asynchronous may improve resiliency to outages or backups in remote computing regions. For example, the use of region-specific workers 312 that are asynchronous may prevent an outage or backup in a given remote region from cascading/spreading to other regions. As also indicated in notes 301, the fleet worker 310 and the region-specific workers 312 may access the fleet resource record 309 and/or the region-specific resource records 311 via internal API's.

Figure 4:
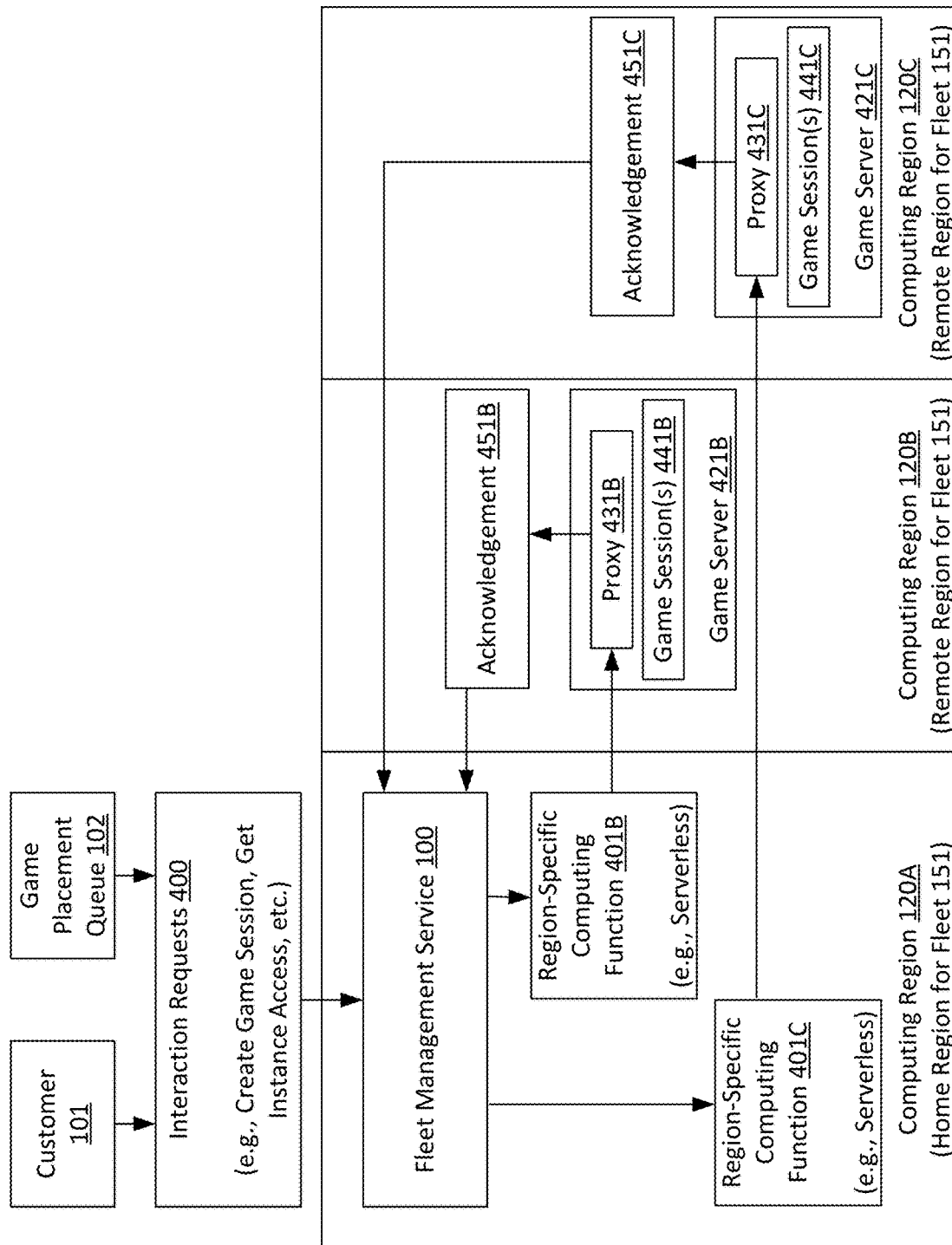
FIG. 4 is a diagram illustrating an example remote game server interaction system that may be used in accordance with the present disclosure.

Additionally, in some examples, region-specific serverless computing functions may be employed to allow real-time interactions with specific game servers in specific remote computing regions. Referring now to FIG. 4, an example remote game server interaction system will now be described in FIG. 4. In the example of FIG. 4, customer 101 and game placement queue 102 may issue interaction requests 400 to fleet management service 100, which operates in the home computing region of fleet 151 (computing region 120A). Interaction requests 400 may be requests to perform an interaction with a specific game server in fleet 151, including game servers in remote regions of fleet 151 (computing regions 102B and 120C). Examples of these interactions may include instructing the game server to create a game session, remotely accessing the game server (e.g., to debug the game server, to gather benchmarking data, to observe activity in real-time), and the like.

As shown in FIG. 4, computing region 120B includes a game server 421B and any number of other game servers (not shown in FIG. 4), and computing region 120C includes a game server 421C and any number of other game servers (not shown in FIG. 4). Game server 421B executes one or more game session(s) 441B, and game server 421C executes one or more game session(s) 441C. Each one of game session(s) 441B may include any number of game players, and each one of game session(s) 441C may include any number of game players.

Region-specific computing functions 401B and 401C may execute in the home region of fleet 151 (computing region 120A). In this example, region-specific computing function 401B may be invoked, by the fleet management service 100, to assist in interacting with game server 421B executing in computing region 120B. Region-specific computing function 401B may communicate with game server 421B via proxy 431B on game server 421B. Region-specific computing function 401B may also optionally be invoked any number of other times to assist in performing other interactions with other individual game servers that may also execute in computing region 120B (but that are not shown in FIG. 4). Additionally, in this example, region-specific computing function 401C may be invoked, by the fleet management service 100, to assist in interacting with game server 421C executing in computing region 120C. Region-specific computing function 401C may communicate with game server 421C via proxy 431C on game server 421C. Region-specific computing function 401C may also optionally be invoked any number of other times to assist in performing other interactions with other individual game servers that may also execute in computing region 120C (but that are not shown in FIG. 4).

The use of region-specific computing functions 401B and 401C may allow the interactions to be performed in real-time, as the region-specific computing functions 401B and 401C may optionally be invoked instantaneously after receiving respective ones of interaction requests 400. The region-specific computing functions 401B and 401C may be serverless computing functions, whose execution may be triggered by receipt of respective ones of interaction requests 400. The region-specific computing functions 401B and 401C may also be asynchronous. The use of region-specific computing functions 401B and 401C that are asynchronous may improve resiliency to outages or backups in remote computing regions (computing regions 120B and 120C). For example, the use of region-specific computing functions 401B and 401C that are asynchronous may prevent an outage or backup in a given remote region from cascading/spreading to other regions. Moreover, because serverless computing functions may often have concurrency limits, the use of region-specific computing functions 401B and 401C may also prevent a highly trafficked region from monopolizing these resources.

In the example of FIG. 4, acknowledgements 451B and 451C may be received by the fleet management service 100 in the home region of fleet 151 (computing region 120A). Acknowledgements 451B and 451C may be sent by the game servers 421B and 421C, respectively. Acknowledgements 451B and 451C may confirm that instructions related to a respective interaction have been successfully received by the game servers 421B and 421C, respectively. Acknowledgements 451B and 451C may additionally or alternatively confirm that a requested operation (e.g., creation of a game session) has been successfully performed by the game servers 421B and 421C, respectively. In some examples, acknowledgements 451B and 451C may be sent and received via an asynchronous publish and subscribe protocol.

In some examples, performance metric data related to fleet 151 may be provided via the fleet management service 100 operating in the home computing region of fleet 151 (computing region 120A). Each of the game servers in fleet 151 may provide performance metric data to fleet management service 100. The fleet management service 100 may then, upon request, provide performance metric data for fleet 151 to the customer 101. In some cases, each of these game servers may include an indication (e.g., an attribute value) in the performance metric data provided to fleet management service 100 to indicate the computing region in which the game server operates. This may allow performance metric data for fleet 151 to be broken down into individual regions. Thus, performance metric data for fleet 151 may optionally be aggregated at a fleet-wide level (e.g., across computing regions 120A, 120B and 120C) and/or at an individual region level.

Figure 5:
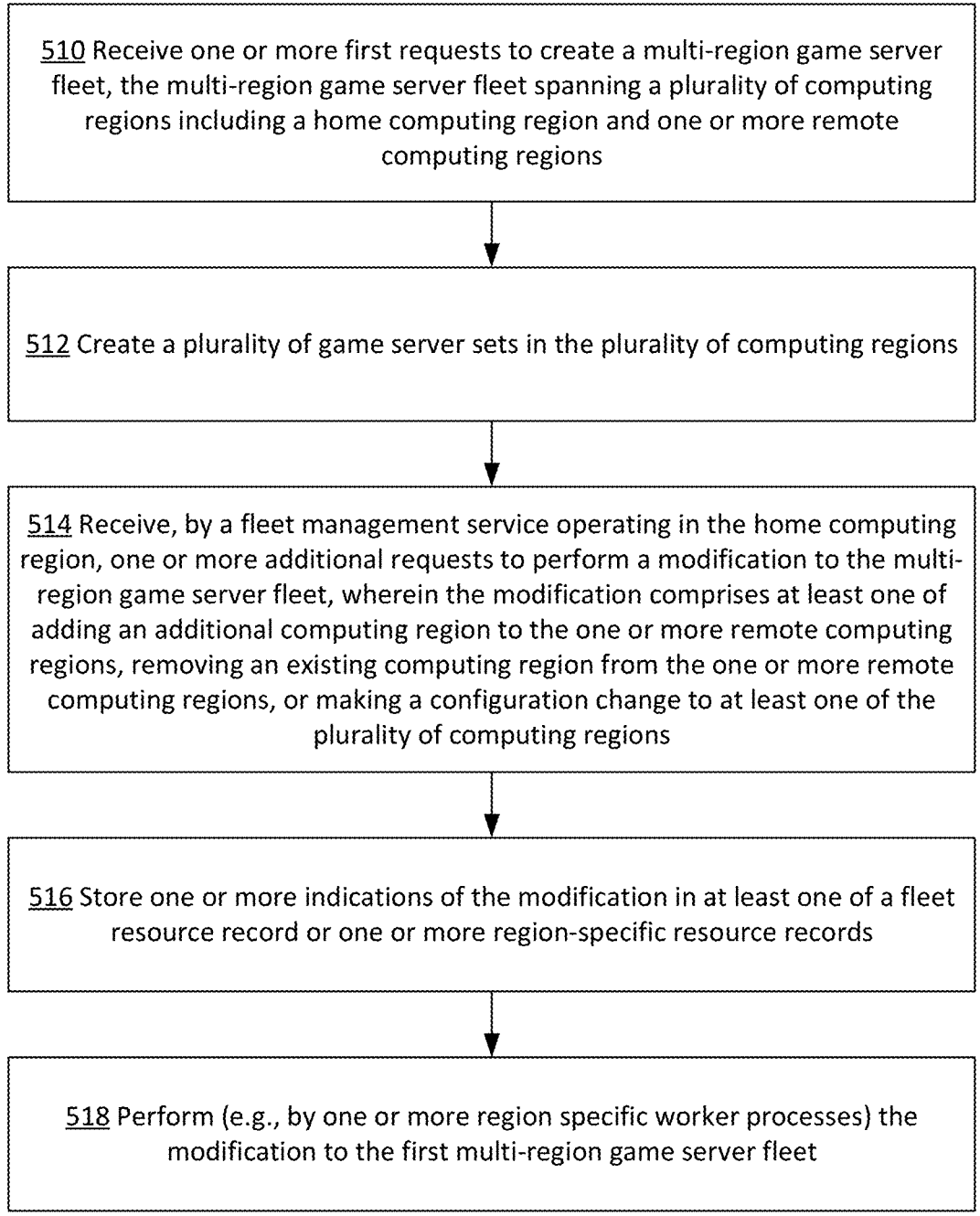
FIG. 5 is a flowchart illustrating an example an example multi-region game server fleet modification process that may be used in accordance with the present disclosure.

FIG. 5 is a flowchart illustrating an example an example multi-region game server fleet modification process that may be used in accordance with the present disclosure. The process of FIG. 5 is initiated at operation 510, at which one or more first requests are received to create a multi-region game server fleet, the multi-region game server fleet spanning a plurality of computing regions including a home computing region and one or more remote computing regions. For example, in some cases, a request may be received, by a multi-tenant gaming service, from a customer of the multi-tenant gaming service, such as via one or more API calls, to create a multi-region game server fleet. The request may specify a customer-selected home region as well as one or more customer-selected remote regions. In some examples, at least one of the one or more remote computing regions may lack support for one or more computing services that are supported in the home computing region.

At operation 512, a plurality of game server sets is created in the plurality of computing regions. When a multi-region fleet is created, a virtual machine image for the fleet may be generated in the home region of the fleet. The virtual machine image may be generated based on the video game build with which the fleet is associated. After being generated in the home region, the virtual machine image may be copied to each remote region of the fleet. In some examples, the virtual machine image may be copied to remote regions directly from the home region or indirectly via one or more other intermediate remote regions. In some examples, to prevent a single customer from consuming excessive copying resources, each customer may be limited to a maximum number of regions to which a virtual machine image may be concurrently copied from a single source region.

Game server sets may be generated in each region of the fleet, including the home region and each remote region of the fleet. For example, as shown in FIG. 1, game server set 110A executes in computing region 120A (the home region for fleet 151), game server set 110B executes in computing region 120B (a remote region for fleet 151), and game server set 110C executes in computing region 120C (another remote region for fleet 151). Each game server in within the plurality of game server sets may be created based on the virtual machine image for the fleet.

The virtual machine image is created in the home region and may, therefore, be available in the home region upon its creation. Additionally, the virtual machine image may be copied to remote regions as part of the location creation workflows for those remote regions. As described above with reference to FIG. 3, region-specific workers may be employed to launch location creation workflows for remote regions. For example, when computing region 120B is added to fleet 151, the fleet management service 100 may record an indication of computing region 120B as a remote region in fleet resource record 309. The fleet worker 310 may then create region-specific resource record 311B for computing region 120B. The creation of region-specific resource record 311B may trigger creation of region-specific worker 312B. The region-specific worker 312B may then launch a creation workflow for the computing region 120B, which may include copying a virtual machine image to computing region 120B and creating game server set 110B in computing region 120B based on the virtual machine image (e.g., by copying the virtual machine image to game servers in game server set 110B).

At operation 514, one or more additional requests are received, by a fleet management service operating in the home computing region, to perform a modification to the multi-region game server fleet, wherein the modification comprises at least one of adding an additional computing region to the one or more remote computing regions, removing an existing computing region from the one or more remote computing regions, or making a configuration change to at least one of the plurality of computing regions. In some examples, a customer may issue one or more API calls requesting the modification, and these API calls may be received by the fleet management service operating in the home computing region. As described above, these requests may be issued to the fleet management service operating in the home region even when the modification is to be performed in a remote region.

At operation 516, one or more indications of the modification is stored in at least one of a fleet resource record or one or more region-specific resource records. As described above with reference to FIG. 3, fleet worker 310 and region-specific workers 312 may operate in computing region 120A, which is the home computing region of fleet 151. Region-specific workers 312 include region-specific worker 312B (corresponding to computing region 120B) and region-specific worker 312C (corresponding to computing region 120C). Computing region 120A further includes fleet resource record 309 and region-specific resource records 111. The fleet resource record 309 may include, for example, indications of remote regions that are currently included in the fleet 151 as well as indications of fleet-wide configuration settings. The region-specific resource records 311 may include, for example, indications of region-specific configuration settings. Moreover, creation of one of region-specific resource records 311 may cause a respective one of the region-specific workers 312 to be generated for the corresponding region. Region-specific resource records 311 include region-specific resource record 311B (corresponding to computing region 120B) and region-specific resource record 311C (corresponding to computing region 120C).

In some examples, when a remote region is being added to the fleet 151, the fleet management service 100 operating in the home computing region (computing region 120A) may record an indication of the new region in fleet resource record 309. The fleet worker 310 may then create one of region-specific resource records 311 for the new region, thereby triggering creation of one of region-specific workers 312 for that region. For a configuration change, the fleet management service 100 may record the configuration change in the fleet resource record 309 (if the change applies across all regions in the fleet) or in one or more of the region-specific resource records 311 (if the change applies only to specific remote regions). Region-specific workers 312 may periodically check (e.g., via internal API's) the fleet resource record 309 and their respective region-specific resource records 311 to determine if any new configuration changes have been recorded. When a remote region is being removed from the fleet 151, the fleet management service 100 may record an indication to remove the region in the fleet resource record 309. One of the region-specific workers 312 for that region may then become aware of this indication and begin a workflow to cease operation of fleet 151 in that remote region.

At operation 518, the modification is performed to the first multi-region game server fleet. The modification may be performed based at least in part on the storing of the one or more indications of the modification at operation 516. The modification may be propagated to one or more remote regions by one or more region-specific worker processes, and the one or more region-specific worker processes may operate asynchronously. Thus, the modification may be performed, at least in part, by the one or more region-specific worker processes. As described above with reference to FIG. 3, region-specific worker 312B may be employed to perform modification 350B in computing region 120B. Additionally, region-specific worker 312B may be employed to perform modification 350C in computing region 120C. Modifications 350B and 350C may include, for example, adding a remote region to the fleet, removing a remote region from the fleet, and performing configuration changes (e.g., adding, removing or changing a scaling policy, port settings, etc.).

For example, when computing region 120B is added to fleet 151, the fleet management service 100 may record an indication of computing region 120B as a remote region in fleet resource record 309. The fleet worker 310 may then create region-specific resource record 311B for computing region 120B. The creation of region-specific resource record 311B may trigger creation of region-specific worker 312B. The region-specific worker 312B may then launch a creation workflow for the computing region 120B, which may include copying a virtual machine image to computing region 120B and creating game server set 110B in computing region 120B based on the virtual machine image (e.g., by copying the virtual machine image to game servers in game server set 110B).

As another example, for a configuration change that is made only to computing region 120B, the fleet management service 100 may record the configuration change in region-specific resource record 311B. Region-specific worker 312 may check region-specific resource record 311B to determine that the new configuration change has been recorded. Region-specific worker 312B may then propagate the new configuration change to computing region 120B. Thus, in this example, modification 350B would include applying the configuration change to computing region 120B.

As yet another example, if computing region 120B were being removed from fleet 151, the fleet management service 100 may record an indication to remove the computing region 120B from fleet 151 in the fleet resource record 309. Region-specific worker 312B may then become aware of this indication and begin a workflow to cease operation of fleet 151 in computing region 120B. Thus, in this example, modification 350B would include removing computing region 120B from fleet 151, such as by launching a removal workflow for the computing region 120B.

Figure 6:
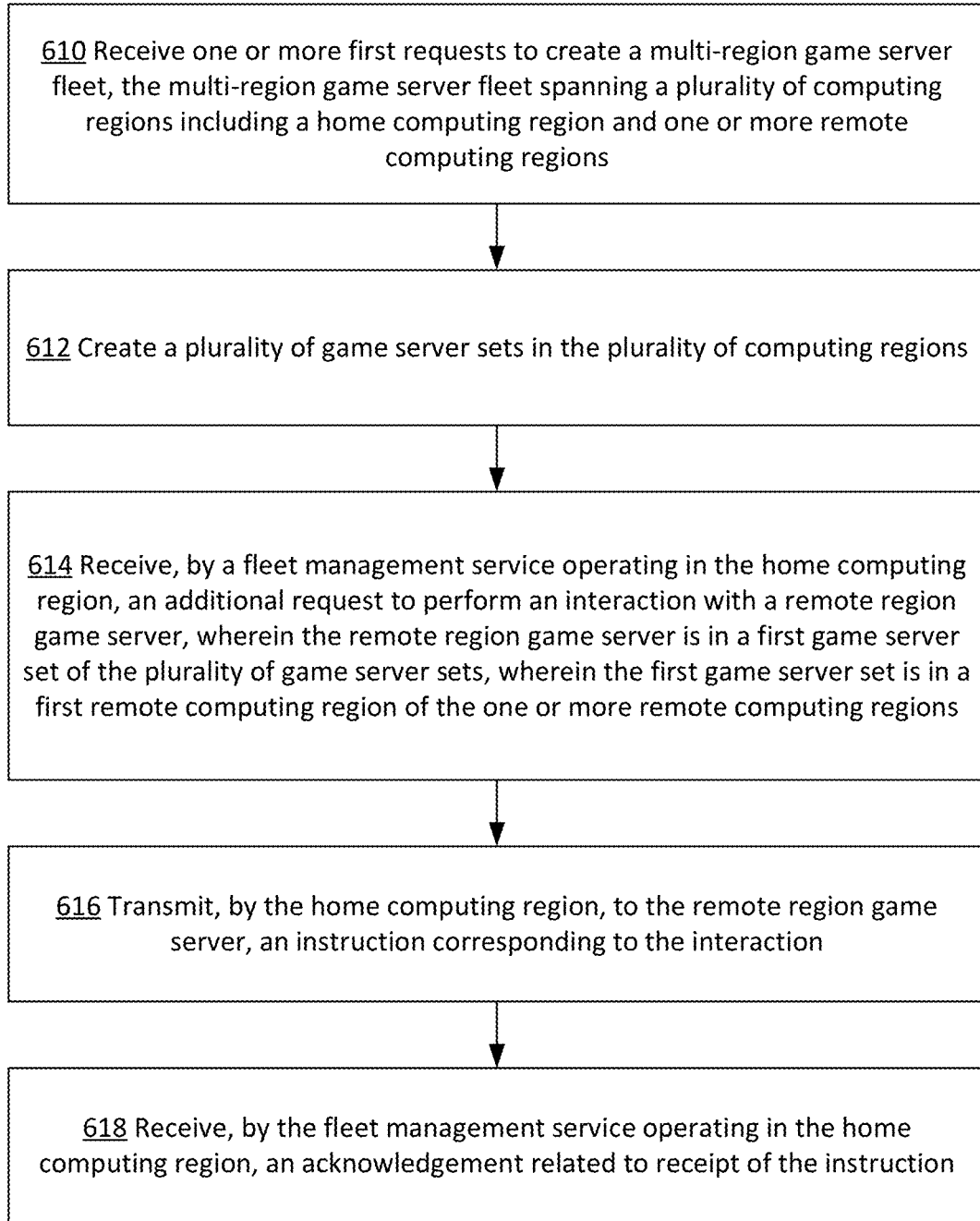
FIG. 6 is a flowchart illustrating an example remote game server interaction process that may be used in accordance with the present disclosure.

FIG. 6 is a flowchart illustrating an example remote game server interaction process that may be used in accordance with the present disclosure. The process of FIG. 6 is initiated at operation 610, at which one or more first requests are received to create a multi-region game server fleet, the multi-region game server fleet spanning a plurality of computing regions including a home computing region and one or more remote computing regions. It is noted that operation 610 of FIG. 6 is identical to operation 510 of FIG. 5. Thus, the description of operation 510 may apply also to operation 610, without being repeated here. At operation 612, a plurality of game server sets is created in the plurality of computing regions. It is noted that operation 612 of FIG. 6 is identical to operation 512 of FIG. 5. Thus, the description of operation 512 may apply also to operation 612, without being repeated here.

At operation 614, an additional request to perform an interaction with a remote region game server is received, by a fleet management service operating in the home computing region, wherein the remote region game server is in a first game server set of the plurality of game server sets, and wherein the first game server set is in a first remote computing region of the one or more remote computing regions. For example, as shown in FIG. 4, interaction requests 400 may be received by fleet management service 100, which operates in the home computing region of fleet 151 (computing region 120A). Interaction requests 400 may be requests to perform an interaction with a specific game server in fleet 151, including game servers in remote regions of fleet 151 (computing regions 102B and 120C). The interaction may optionally be performed in real-time. In some examples, the interaction may include instructing the remote region game server to create a game session. Additionally, in some examples, the interaction may include remotely accessing the remote region game server, by a user (e.g., to debug the game server, to gather benchmarking data, to observe activity in real-time, etc.). In some cases, the additional request may be issued by a customer of a gaming service that hosts the multi-region game server fleet on behalf of the customer. Additionally, in some cases, the additional request may be issued by a game placement queue. As described above, in some examples, requests to create game sessions within the multi-region game server fleet may be issued, by the customer and/or the game placement queue, only to the home computing region, even when the game sessions are requested to be created in remote computing regions.

At operation 616, an instruction corresponding to the interaction is transmitted, by the home computing region, to the remote region game server. For example, if the requested interaction is instructing the remote region game server to create a game session, then the instruction transmitted at operation 616 may be an instruction to create the game session. As another example, if the requested interaction is remotely accessing the remote region game server, then the instruction transmitted at operation 616 may be an instruction to allow a user to remotely access to the remote region game server. In some examples, the instruction may be transmitted to the remote region game server via a serverless computing function hosted in the home computing region. Additionally, in some examples, the serverless computing function may be a region-specific serverless computing function that performs cross-region communications from the home computing region to only the first remote computing region. For example, as shown in FIG. 5, region-specific computing functions 401B and 401C may execute in the home region of fleet 151 (computing region 120A). In this example, region-specific computing function 401B may be invoked, by the fleet management service 100, to assist in interacting with game server 421B executing in computing region 120B. Additionally, in this example, region-specific computing function 401C may be invoked, by the fleet management service 100, to assist in interacting with game server 421C executing in computing region 120C.

At operation 618, an acknowledgement related to receipt of the instruction is received, by the fleet management service operating in the home computing region. For example, as shown in FIG. 5, acknowledgements 451B and 451C may be received by the fleet management service 100 in the home region of fleet 151 (computing region 120A). Acknowledgements 451B and 451C may be sent by the game servers 421B and 421C, respectively. Acknowledgements 451B and 451C may confirm that instructions related to a respective interaction have been successfully received by the game servers 421B and 421C, respectively. Acknowledgements 451B and 451C may additionally or alternatively confirm that a requested operation (e.g., creation of a game session) has been successfully performed by the game servers 421B and 421C, respectively. In some examples, acknowledgements 451B and 451C may be sent and received via an asynchronous publish and subscribe protocol.

In some examples, such as described above with reference to FIG. 2, in order to provide redundancy against home region backups and outages, a single customer may create a plurality of multi-region fleets with different home regions. For example, in some cases, the multi-region fleet described in operations 510 and 512 of FIG. 5 and/or operations 610 and 612 of FIG. 6 may be a first multi-region game server fleet spanning a first plurality of computing regions including a first home computing region and one or more first remote computing regions, and a first plurality of game server sets may be created in the first plurality of computing regions. Additionally, one or more second requests may be received to create a second multi-region game server fleet, the second multi-region game server fleet spanning a second plurality of computing regions including a second home computing region and one or more second remote computing regions, wherein the second home computing region is different from the first home computing region, and a second plurality of game server sets may be created in the second plurality of computing regions. In some examples, the one or more first requests to create the first multi-region game server fleet and the one or more second requests to create the second multi-region game server fleet may be received from a same customer of a multi-tenant gaming service.

Figure 7:
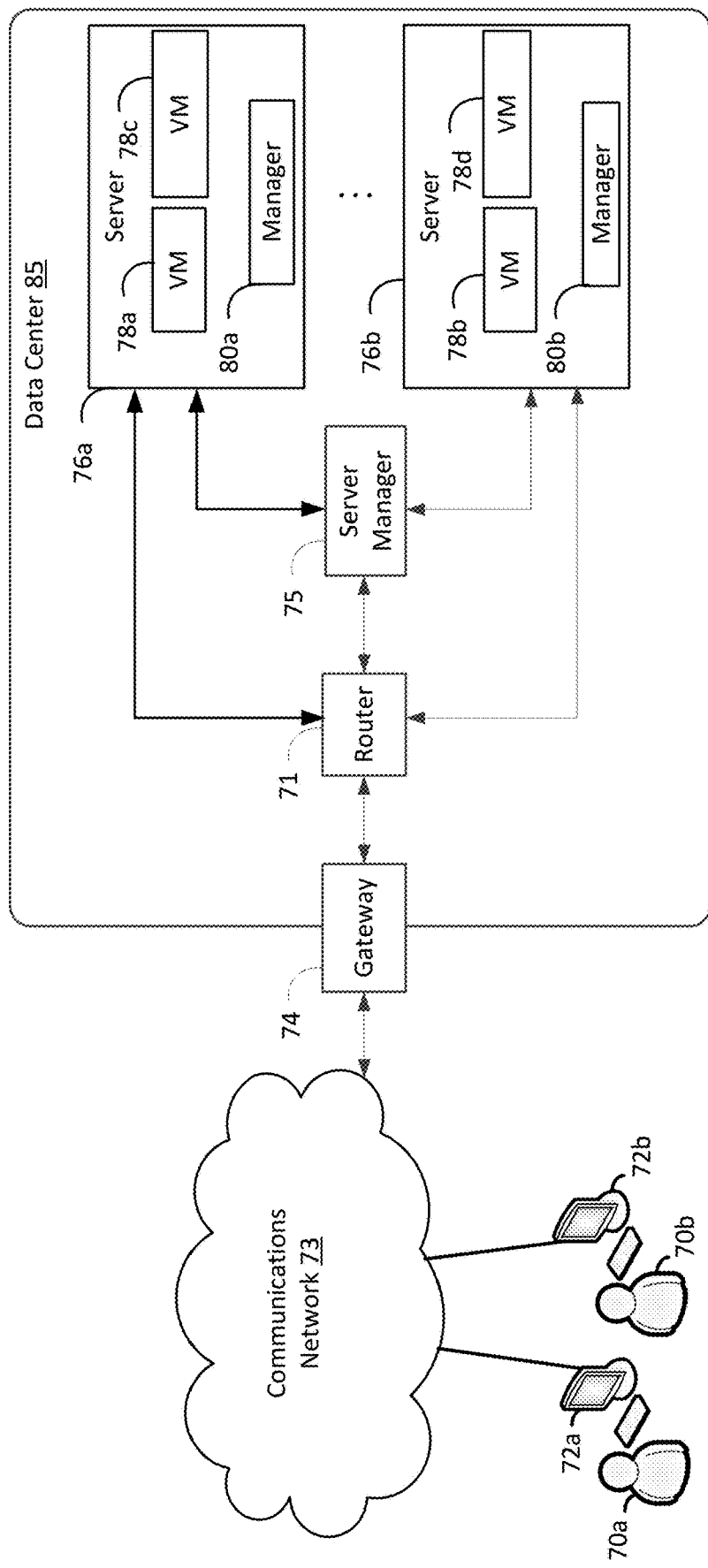
FIG. 7 is a diagram illustrating an example system for transmitting and providing data that may be used in accordance with the present disclosure.

An example system for transmitting and providing data will now be described in detail. In particular, FIG. 7 illustrates an example computing environment in which the embodiments described herein may be implemented. FIG. 7 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
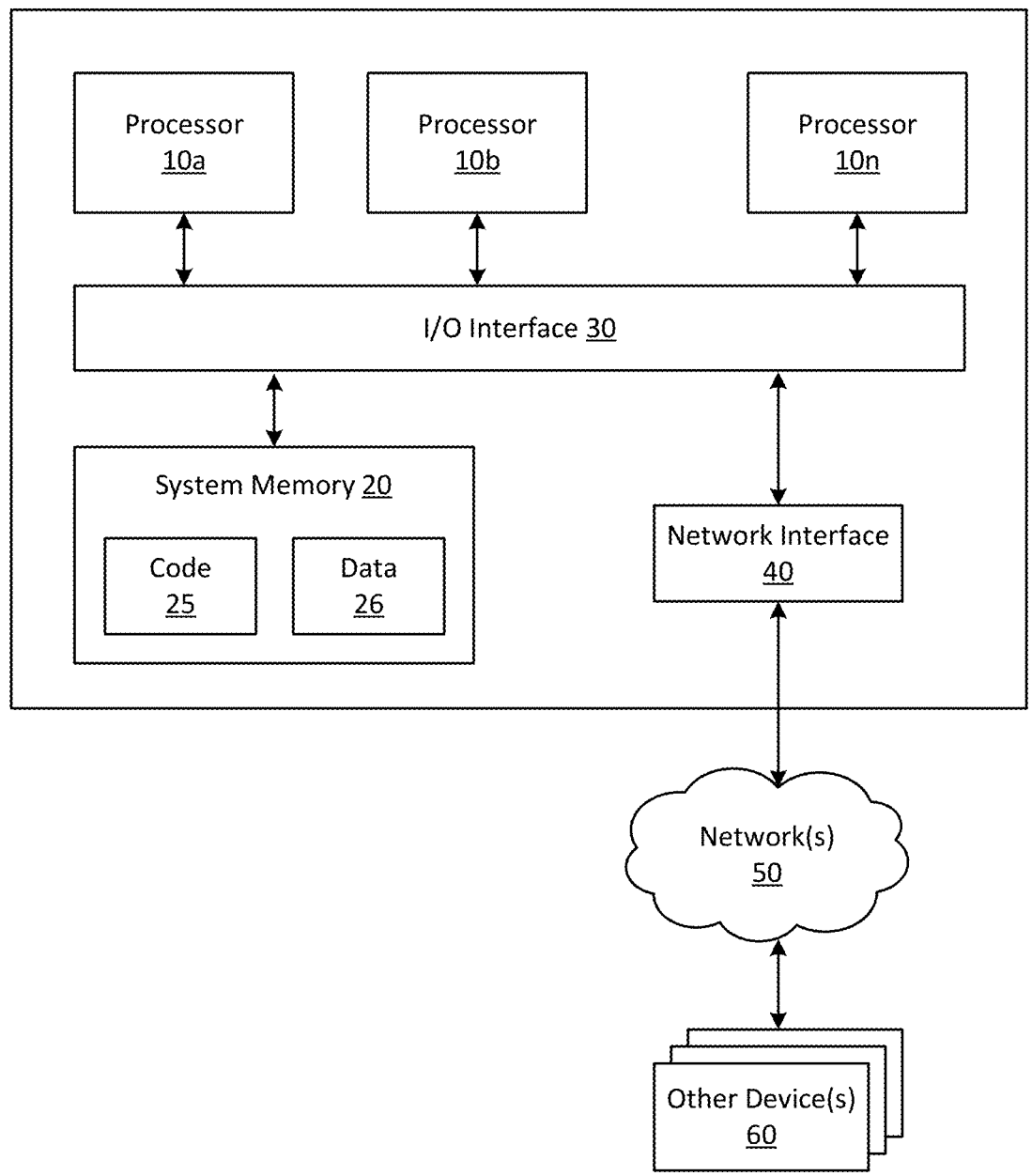
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from outages in other availability zones. That is, an outage in one availability zone may not be expected to result in an outage in any other availability zone. Thus, the availability profile of a resource instance is intended to be independent of the availability profile of a resource instance in a different availability zone. Clients may be able to protect their applications from outages at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
   one or more processors; and
   one or more memories having stored thereon computing instructions that, when executed by the one or more processors, cause the computing system to perform operations comprising:
   receiving one or more first requests to create a multi-region game server fleet, the multi-region game server fleet spanning a plurality of computing regions including a home computing region and one or more remote computing regions, wherein the plurality of computing regions are separate collections of computing resources implemented on computing devices that are located in corresponding geographic areas;
   creating a plurality of game server sets in the plurality of computing regions;
   receiving, by a fleet management service operating in the home computing region, an additional request to perform an interaction with a remote region game server, wherein the remote region game server is in a first game server set of the plurality of game server sets, and wherein the first game server set is in a first remote computing region of the one or more remote computing regions;
   transmitting, by a computing function hosted in the home computing region, to the remote region game server, an instruction corresponding to the interaction, wherein the computing function performs cross-region communications from the home computing region to only the first remote computing region; and
   receiving, by the fleet management service operating in the home computing region, an acknowledgement related to receipt of the instruction.

2. The computing system of claim 1, wherein the additional request is issued by a game placement queue.

3. The computing system of claim 1, wherein the additional request is issued by a customer of a gaming service that hosts the multi-region game server fleet on behalf of the customer.

4. The computing system of claim 1, wherein requests to create game sessions within the multi-region game server fleet are issued, by at least one of a customer or a game placement queue, only to the home computing region.

5. A computer-implemented method comprising:
   receiving one or more first requests to create a multi-region game server fleet, the multi-region game server fleet spanning a plurality of computing regions including a home computing region and one or more remote computing regions, wherein the plurality of computing regions are separate collections of computing resources implemented on computing devices that are located in corresponding geographic areas;

creating a plurality of game server sets in the plurality of computing regions;

receiving, by a fleet management service operating in the home computing region, an additional request to perform an interaction with a remote region game server, wherein the remote region game server is in a first game server set of the plurality of game server sets, and wherein the first game server set is in a first remote computing region of the one or more remote computing regions;

transmitting, by the home computing region, to the remote region game server, an instruction corresponding to the interaction; and receiving, by the fleet management service operating in the home computing region, an acknowledgement related to receipt of the instruction.

6. The computer-implemented method of claim 5, wherein the additional request is issued by a game placement queue.

7. The computer-implemented method of claim 5, wherein the additional request is issued by a customer of a gaming service that hosts the multi-region game server fleet on behalf of the customer.

8. The computer-implemented method of claim 5, wherein requests to create game sessions within the multi-region game server fleet are issued, by at least one of a customer or a game placement queue, only to the home computing region.

9. The computer-implemented method of claim 5, wherein the interaction comprises instructing the remote region game server to create a game session.

10. The computer-implemented method of claim 5, wherein the interaction comprises remotely accessing the remote region game server.

11. The computer-implemented method of claim 5, wherein the instruction is transmitted to the remote region game server via a serverless computing function hosted in the home computing region.

12. The computer-implemented method of claim 11, wherein the serverless computing function performs cross-region communications from the home computing region to only the first remote computing region.

13. The computer-implemented method of claim 5, wherein the interaction is performed in real-time.

14. One or more non-transitory computer-readable storage media having stored thereon computing instructions that, upon execution by a computing system, cause the computing system to perform operations comprising:

receiving one or more first requests to create a multi-region game server fleet, the multi-region game server fleet spanning a plurality of computing regions including a home computing region and one or more remote computing regions, wherein the plurality of computing regions are separate collections of computing resources implemented on computing devices that are located in corresponding geographic areas;

creating a plurality of game server sets in the plurality of computing regions;

receiving, by a fleet management service operating in the home computing region, an additional request to perform an interaction with a remote region game server, wherein the remote region game server is in a first game server set of the plurality of game server sets, and wherein the first game server set is in a first remote computing region of the one or more remote computing regions;

transmitting, by the home computing region, to the remote region game server, an instruction corresponding to the interaction; and receiving, by the fleet management service operating in the home computing region, an acknowledgement related to receipt of the instruction.

15. The one or more non-transitory computer-readable storage media of claim 14, wherein requests to create game sessions within the multi-region game server fleet are issued, by at least one of a customer or a game placement queue, only to the home computing region.

16. The one or more non-transitory computer-readable storage media of claim 14, wherein the interaction comprises instructing the remote region game server to create a game session.

17. The one or more non-transitory computer-readable storage media of claim 14, wherein the interaction comprises remotely accessing the remote region game server.

18. The one or more non-transitory computer-readable storage media of claim 14, wherein the instruction is transmitted to the remote region game server via a serverless computing function hosted in the home computing region.

19. The one or more non-transitory computer-readable storage media of claim 18, wherein the serverless computing function performs cross-region communications from the home computing region to only the first remote computing region.

20. The one or more non-transitory computer-readable storage media of claim 14, wherein the remote region game server provides performance metric data to the fleet management service, the performance metric data comprising an indication that the remote region game server operates in the first remote computing region.

* * * * *